US011822556B2

(12) United States Patent
Pippin et al.

(10) Patent No.: US 11,822,556 B2
(45) Date of Patent: Nov. 21, 2023

(54) EXACTLY-ONCE PERFORMANCE FROM A STREAMING PIPELINE IN A FAULT-VULNERABLE SYSTEM

(71) Applicant: YAHOO ASSETS LLC, Dulles, VA (US)

(72) Inventors: Michael Pippin, Sunnyvale, CA (US); David Willcox, Urbana, IL (US); Allie K. Watfa, Urbana, IL (US); George Aleksandrovich, Hoffman Estates, IL (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 17/818,808

(22) Filed: Aug. 10, 2022

(65) Prior Publication Data
US 2022/0382762 A1  Dec. 1, 2022

Related U.S. Application Data

(63) Continuation of application No. 16/881,257, filed on May 22, 2020, now Pat. No. 11,416,497.

(51) Int. Cl.
| | |
|---|---|
| G06F 16/2455 | (2019.01) |
| G06F 16/22 | (2019.01) |
| G06F 9/54 | (2006.01) |
| G06F 16/17 | (2019.01) |
| G06F 16/182 | (2019.01) |
| G06F 16/215 | (2019.01) |

(52) U.S. Cl.
CPC ........ *G06F 16/24568* (2019.01); *G06F 9/542* (2013.01); *G06F 9/546* (2013.01); *G06F 16/1734* (2019.01); *G06F 16/182* (2019.01); *G06F 16/215* (2019.01); *G06F 16/2282* (2019.01); *G06F 16/2456* (2019.01)

(58) Field of Classification Search
None
See application file for complete search history.

(56) References Cited

U.S. PATENT DOCUMENTS 9,081,771 B1    7/2015 Faibish et al.
11,416,497 B2 * 8/2022 Pippin ................. G06F 16/1734
(Continued)

*Primary Examiner* — Kim T Nguyen
(74) *Attorney, Agent, or Firm* — James J. DeCarlo; Greenberg Traurig, LLP

(57) ABSTRACT

Disclosed are embodiments for providing batch performance using a stream processor. In one embodiment, a method is disclosed comprising receiving a stream of events, where each event comprises a header including an event type field and a timestamp. and identifying that the header of a given event in the stream of events includes at least one secondary event in a list of secondary identifiers included in the header. A flag is set in a distributed database for the at least one secondary event, then writing the given event to a table in the distributed database occurs, the table selected based on a respective event type field and timestamp associated with the given event. Deduplicating the given event and the at least one secondary event in response to a close of books (COB) signal occurs, after which writing at least one deduplicated event to a storage device occurs, the at least one deduplicated event selected from the group consisting of the given event and the at least one secondary event.

20 Claims, 8 Drawing Sheets

(56) References Cited

U.S. PATENT DOCUMENTS

| | | |
|---|---|---|
| 2013/0260896 A1 | 10/2013 | Miura et al. |
| 2017/0010809 A1 | 1/2017 | Hironaka et al. |
| 2018/0060540 A1* | 3/2018 | Caruso ................ G06F 16/2365 |
| 2019/0270019 A1 | 9/2019 | Miura et al. |
| 2019/0270020 A1 | 9/2019 | Miura et al. |
| 2021/0157523 A1 | 5/2021 | Matsushita et al. |
| 2021/0365462 A1* | 11/2021 | Pippin ................ G06F 16/2282 |
| 2022/0382762 A1* | 12/2022 | Pippin ................ G06F 16/2282 |

* cited by examiner

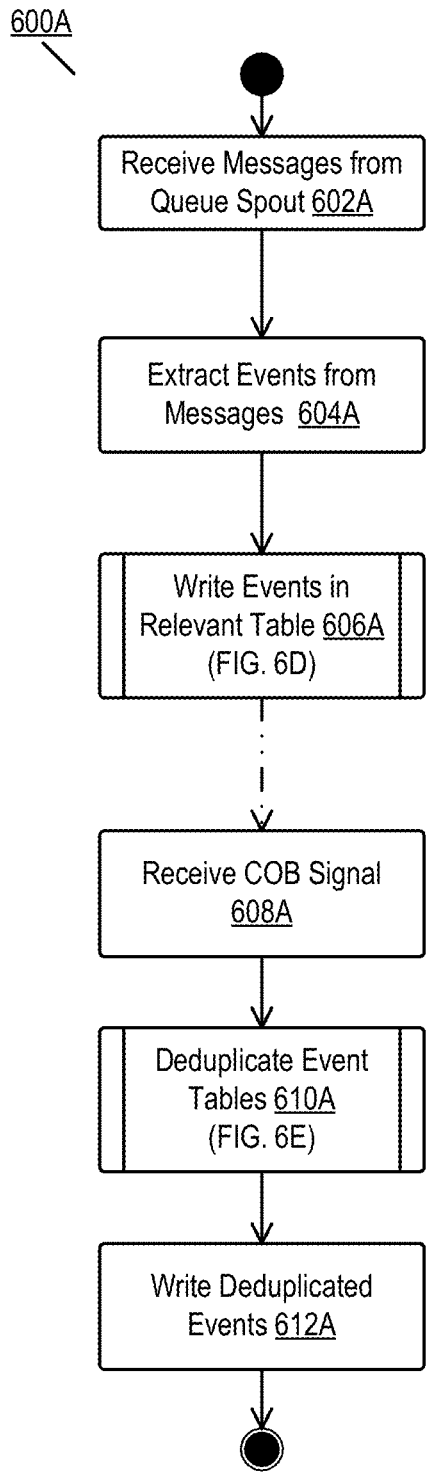
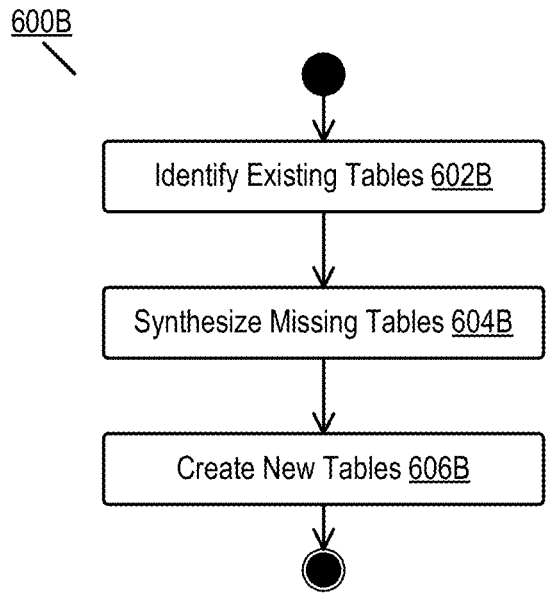
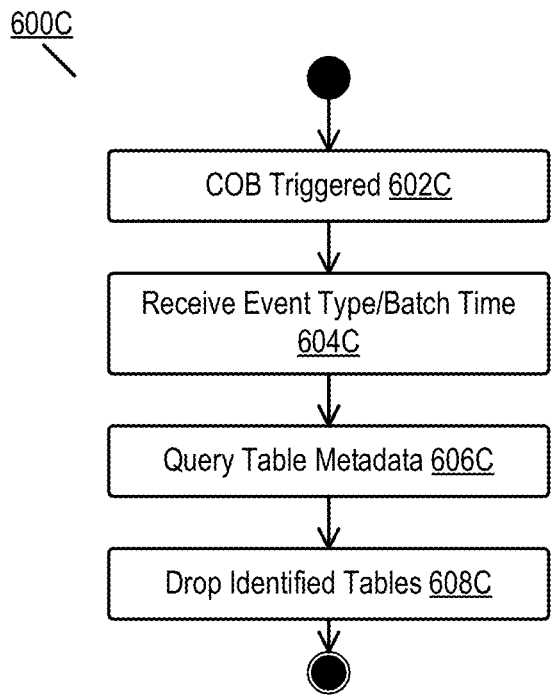
FIG. 6A
FIG. 6B
FIG. 6C

EXACTLY-ONCE PERFORMANCE FROM A STREAMING PIPELINE IN A FAULT-VULNERABLE SYSTEM

CROSS REFERENCE TO RELATED APPLICATIONS

This application is a continuation of, and claims priority from, co-pending U.S. patent application Ser. No. 16/881,257, filed May 22, 2020, entitled EXACTLY-ONCE PERFORMANCE FROM A STREAMING PIPELINE IN A FAULT-VULNERABLE SYSTEM, the contents of which are hereby incorporated by reference.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the era of big data processing, data pipelines have become vital to ingesting, processing, and outputting large quantities of data at high velocity and having high variability. In general, a data pipeline comprises a series of automated processing stages that take raw input data and convert the raw input data into a more suitable format for consumption by downstream computer processing systems.

Various architectures of data pipelines exist, including batch, Lambda, and Kappa architectures. Batch data pipelines process data in "batches" at regular intervals and are suitable for non-critical functionality while providing high reliability of data processing. Batch data pipelines, however, suffer from not being able to process data in real-time. Thus, a lag behind the ingestion of data and output of useful information or knowledge always exists in a batch data pipeline.

Lambda pipelines utilize a batch processor concurrently with a stream processor. In these pipelines, the batch processor processes all data within a historical batch while the stream processor "augments" the processed batch data with the results of stream processing. Eventually, the batch processor will "re-process" the data processed by the stream processor and overwrite the information generated by the stream processor. Lambda pipelines are fast, due to the use of stream processors; however, they require duplication of processing logic in both the stream processors and the batch processors. Further, Lambda pipelines use twice the processing hardware due to the use of two separate processing paradigms (i.e., stream and batch, which process the data in the same manner).

Like Lambda pipelines, Kappa pipelines utilize a stream processor. However, Kappa pipelines eschew a batch processor. Kappa pipelines require frequent "re-running" of event streams through the stream processor to provide simulated batch performance. Kappa pipelines ensure that streaming data is processed correctly (e.g., the pipeline does not drop or duplicate data); however, these pipelines ensure this by re-executing processing and are thus slower than pure streaming pipelines. Further, since Kappa pipelines use stream processing techniques, there is no method for performing more complex operations such as joins or aggregations, since these operations inherently require access to a full (e.g., batch) dataset. That is, stream processors inherently cannot perform these operations, thus replaying streams does not remedy this problem.

BRIEF SUMMARY

This disclosure recognizes a need in the art for a new pipeline architecture that provides the advantages of stream processors (e.g., speed) with the advantages of batch processors (e.g., integrity and complex operations). The disclosed embodiments provide these advantages and solve other problems in existing pipelines.

The disclosed embodiments describe an improved big data processing system that uses a stream processing engine with additional hardware and software to harden inaccuracies detected during stream processing.

In one embodiment, a method comprises receiving a stream of events, each event comprising a header including an event type field and a timestamp; identifying that the header of a given event in the stream of events includes at least one secondary event in a list of secondary identifiers included in the header; setting a flag in a distributed database for the at least one secondary event; writing the given event to a table in the distributed database, the table selected based on a respective event type field and timestamp associated with the given event; deduplicating the given event and the at least one secondary event in response to a close of books (COB) signal; and writing at least one deduplicated event to a storage device, the at least one deduplicated event selected from the group consisting of the given event and the at least one secondary event.

In another embodiment, a non-transitory computer-readable storage medium for tangibly storing computer program instructions capable of being executed by a computer processor comprises computer program instructions defining the steps of: receiving a stream of events, each event comprising a header including an event type field and a timestamp; identifying that the header of a given event in the stream of events includes at least one secondary event in a list of secondary identifiers included in the header; setting a flag in a distributed database for the at least one secondary event; writing the given event to a table in the distributed database, the table selected based on a respective event type field and timestamp associated with the given event; deduplicating the given event and the at least one secondary event in response to a close of books (COB) signal; and writing at least one deduplicated event to a storage device, the at least one deduplicated event selected from the group consisting of the given event and the at least one secondary event.

In another embodiment, a device comprises a processor a storage medium for tangibly storing thereon program logic for execution by the processor, the stored program logic causing the processor to perform the operations of receiving a stream of events, each event comprising a header including an event type field and a timestamp; identifying that the header of a given event in the stream of events includes at least one secondary event in a list of secondary identifiers included in the header; setting a flag in a distributed database for the at least one secondary event; writing the given event to a table in the distributed database, the table selected based on a respective event type field and timestamp associated with the given event; deduplicating the given event and the at least one secondary event in response to a close of books (COB) signal; and writing at least one deduplicated event to a storage device, the at least one deduplicated event selected from the group consisting of the given event and the at least one secondary event.

The illustrated embodiments provide numerous benefits over existing pipelines. The disclosed embodiments reduce data processing and certification times from hours to minutes. The disclosed embodiments additionally utilize a single pipeline and thus do not require the hardware duplication, software complexity, and human resources required by Lambda pipelines. Related, since application-level code must only be deployed once, rapid changes in data processing can be implemented without requiring separate development workflows. Additionally, since only one codebase is used, there is no risk of variations in processing between pipelines. Finally, in existing pipelines, sacrifices for speed can lead to a more significant variation between the initially posted results from the streaming pipeline and the final results from batch processing. As the latency of batch increases relative to streaming, this can lead to a lack of confidence in reporting as the variation becomes more pronounced. The disclosed embodiments do not suffer from this deficiency.

BRIEF DESCRIPTION OF THE FIGURES

FIG. 6A is a flow diagram illustrating the operation of a spooler according to some embodiments of the disclosure.

FIG. 6B is a flow diagram illustrating a table creation process executed by a spooler according to some embodiments of the disclosure.

FIG. 6C is a flow diagram illustrating a table pruning process executed by a spooler according to some embodiments of the disclosure.

DETAILED DESCRIPTION

Figure 1A:
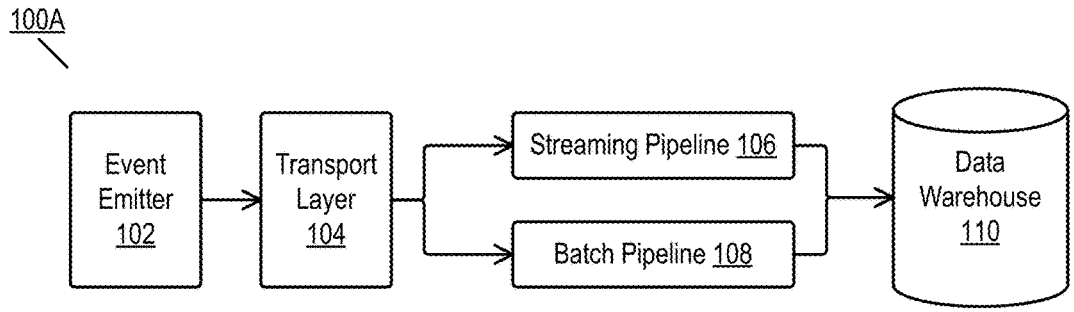
FIG. 1A is a block diagram illustrating a processing system employing a Lambda architecture.

FIG. 1A is a block diagram illustrating a processing system employing a Lambda architecture.

In the illustrated embodiment, events in the system (100a) originate from one or more event emitters (102). As used herein, an event refers to any type of data generated by a computing system. Generally, most events include arbitrary data as well as a timestamp indicating when the event emitter (102) generated the data. Alternatively, or in conjunction with the preceding, the system (100a) adds a timestamp representing the time the pipelines (106, 108) receive the event. In some embodiments, the timestamp comprises a standard time (e.g., based on a 24-hour clock). In some embodiments, the timestamp comprises a numerical value (e.g., time since UNIX epoch). In other embodiments, the timestamp may comprise a sequence number or other incrementing (or otherwise changing) value. In some embodiments, events further include nonce values to ensure uniqueness.

The event emitters (102) can comprise any computing system capable of generating data. The disclosure places no limitations on the type of data or type of systems capable of generating such data. As one example, an event emitter may include a digital analytics system configured to track and monitor user events on webpages or in mobile apps. A digital analytics platform generates many events as users access products. One example is the delivery of advertising creatives. In these scenarios, the analytics platform generates an event indicating that a server transmitted the creative to the end-user. The analytics platform also generates an event indicating that the end-user device displayed the creative (i.e., an impression). If the end-user interacts with the creative, the analytics platform generates a "click" event (which may be any type of interaction including touch events and thus is not limited to physical mouse clicks). In certain embodiments, the analytics platform also generates conversion events that indicate that after an impression, and after a click, the end-user has completed another action (e.g., completes a digital purchase) that is related to the previous events. In some embodiments, the analytics platform tracks all of these events via a client-side identifier stored in, for example, a cookie or other end-user storage mechanism.

In some embodiments, event emitters (102) are part of the system (100a). That is, in some embodiments, the system (100a) includes and has some level of control over the event emitters (102). Examples of this type of arrangement include internal data sources for an organization (e.g., internal analytics tracking). In other embodiments, the event emitters (102) comprise third-party systems. In some embodiments, the system (100a) receives events from both internal and external event emitters (102).

In either scenario, event emitters (102) transmit events over a transport layer (104). The transport layer (104) comprises one or more network protocols and one or more physical media used for transporting data. The disclosure does not unduly limit the structure of the transport layer. In some embodiments, the system (100a) uses an Internet protocol suite (e.g., transmission control protocol (TCP) and Internet protocol (IP)) as the transport layer (104). The system (100a) may use other models such as those adhering to the Open Systems Interconnection (OSI) model or other types of protocol models. In some embodiments, the transport layer (104) performs other operations on the events beyond network routing (e.g., TCP/IP). For example, the transport layer (104) may compress events using, as an example, gzip or other compression algorithms.

The specific internal workings of the transport layer (104) are not limiting, and the system (100a) may ignore various features of the transport layer (104) that are handled entirely in the transport layer (e.g., congestion control in a TCP layer). However, as discussed in more detail herein, the transport layer (104) may include inherent data transfer characteristics that impact the processing of the data by systems. One example, discussed in more detail in FIG. 2 et seq, is that some transport layer (104) designs may unintentionally (or, in some cases, intentionally) duplicate events transmitted over a network. In such networks, the event emitters (102) transmit one event, but the pipelines (106, 108) receive two or more events. A more concrete example of such a transport layer is a publish-subscribe system such as Apache® Kafka, which can provide "at least once" delivery of events.

As illustrated, the system (100a) routes events from the transport layer (104) to both a streaming pipeline (106) and a batch pipeline (108). In the illustrated embodiment, the batch pipeline (108) processes data in batches. As used herein, a batch refers to a period in which the batch pipeline (108) analyzes data (e.g., every hour). The disclosure does not describe the specific inner workings of the batch pipeline (108) in detail; however, the batch pipeline (108) comprises any processing system that provides accurate processing of data. Examples of batch pipelines include Hadoop clusters. The batch pipeline (108) ensures this accuracy by running slowly and at fixed intervals upon receiving all needed data. Since the batch pipeline (108) requires a fixed period of data (e.g., one hour) and a second fixed period to process the data (e.g., three hours), the batch pipelines (108) are consistently "behind" the current time. That is, when the batch pipeline (108) writes data to the data warehouse (110), the data written is "stale" by a fixed amount of time (e.g., four hours in the previous examples). However, as stated above, consumers of the batch-processed data can be confident that the data is accurate.

As a brief aside, before Lambda systems, big data systems often only included a batch pipeline (108) and did not include a streaming pipeline (106). As a result, such systems produced consistently delayed results. To remedy this delay, the system (100a) includes a streaming pipeline (106). Such a pipeline may comprise one or more stream processors such as Apache® Storm processors or similar stream processors. In contrast to the batch pipeline, the streaming pipeline (106) processes data in real-time or near real-time. Thus, when the streaming pipeline (106) receives an event over the transport layer (104), it immediately processes or transforms the event and writes the processed event to the data warehouse (110).

Since the streaming pipeline (106) processes events quickly and in isolation, the streaming pipeline (106) may introduce errors in the processed data. For example, the streaming pipeline (106) generally does not guard against writing duplicate data if the pipeline (106) receives duplicate events. Similarly, the streaming pipeline (106) may inadvertently drop some events. Thus, the streaming pipeline (106) is fast but inaccurate.

In the illustrated embodiment, the data warehouse (110) segments data received from the streaming pipeline (106) and the batch pipeline (108) into two separate storage areas. Additionally, as the batch pipeline (108) "catches up" to the data processed by the streaming pipeline (106), the data warehouse (110) overwrites the results of the streaming pipeline (108). Thus, at any given moment, the data warehouse (110) stores accurate, batch-processed data and a smaller, more recent subset of inaccurate stream-processed data. Absent system failures, the size subset of the inaccurate data remains constant while the size of the accurate data increases over time.

To support the above format of the data warehouse, the system (100a) must duplicate logic between the streaming pipeline (106) and the batch pipeline (108). Since the streaming results must be "reconciled" with the results of the batch processing, the streaming pipeline (106) and batch pipeline (108) must process the events in the same manner. This requirement doubles both the development time and the computing resources needed to support both pipelines (106, 108). Additionally, the system (100a) requires additional software and hardware to enable the data warehouse (110) to perform the reconciliation process after the completion of each batch processing job.

Figure 1B:
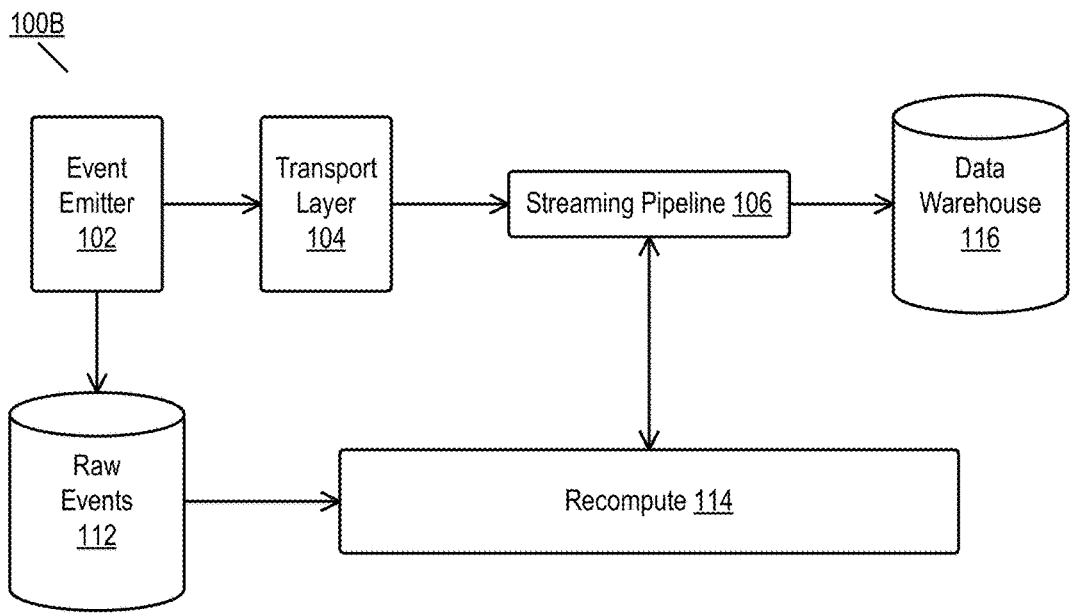
FIG. 1B is a block diagram illustrating a processing system employing a Kappa architecture.

FIG. 1B is a block diagram illustrating a processing system employing a Kappa architecture. The illustrated system (100b) solves some of the problems of Lambda architectures, as discussed in the preceding figure. However, the system (100b) introduces additional problems and fails to provide full batch support.

Various elements of the system (100b) are identical, or nearly identical, to those similarly numbered elements of FIG. 1A. The event emitters (102) and the data transport layer (104) perform the same functions as previously described. Also, the streaming pipeline (106) may perform many, if not all, of the same operations of the streaming pipeline (106) discussed in FIG. 1A.

As illustrated, the streaming pipeline (106) receives events generated by the event emitters (102) over the data transport layer (104). The streaming pipeline (106) processes this data and writes the processed data to the data warehouse (116). In contrast to the data warehouse (110) in FIG. 1A, the data warehouse (116) may only include a single storage area for data given the absence of a batch processing layer.

As described in the description of the previous system (100a), streaming pipelines (106) generally cannot guarantee the accuracy of data processing. Some systems (e.g., 100b) remedy this problem by employing "micro batching" whereby small batches of stream events are processed simultaneously. In general, these batches represent milliseconds of events, thus providing reasonable speed while simulating small batches. Micro-batching, however, fails to provide the level of accuracy provided by larger (e.g., one hour) batches. Another technique uses recompute logic (114) to re-process streaming events when the logic of the streaming pipeline (106) changes or based on other requirements. In this scenario, the system (100b) can store raw events in the raw events storage module (112), the recompute logic (114) retrieves these events. The recompute logic (114) then streams the events into the stream pipeline (106) for re-processing. In one scenario, the recompute logic (114) executes when the system (100b) changes the processing logic of the streaming pipeline. Thus, if the system (100b) modifies how the streaming pipeline (106) processes events, the recompute logic (114) simulates a historical event stream. In another embodiment, the recompute logic (114) can stream data from the raw events storage module (112) to the streaming pipeline (106) at fixed intervals, thus simulating a batch processing mode. However, there are numerous challenges to this approach that limit its effectiveness. First, data from the raw events storage module (112) must be re-streamed in the same order as streamed initially, to ensure the integrity of the re-processing. Thus, the recompute logic (114) reproduces inaccuracies relating to out-of-order events during the re-streaming. Second, the infrastructure that supports the streaming pipeline (106) generally cannot handle significant increases in streaming data, thus limiting the total amount of re-streamed data the streaming pipeline (106) can handle at any given time. Third, and most importantly, the streaming pipeline (106) cannot inherently perform various operations that a batch pipeline (108) can perform, such as joins or aggregations. Thus, even if re-streamed, the output of the streaming pipeline (106) always lacks these advanced operations.

Figure 2:
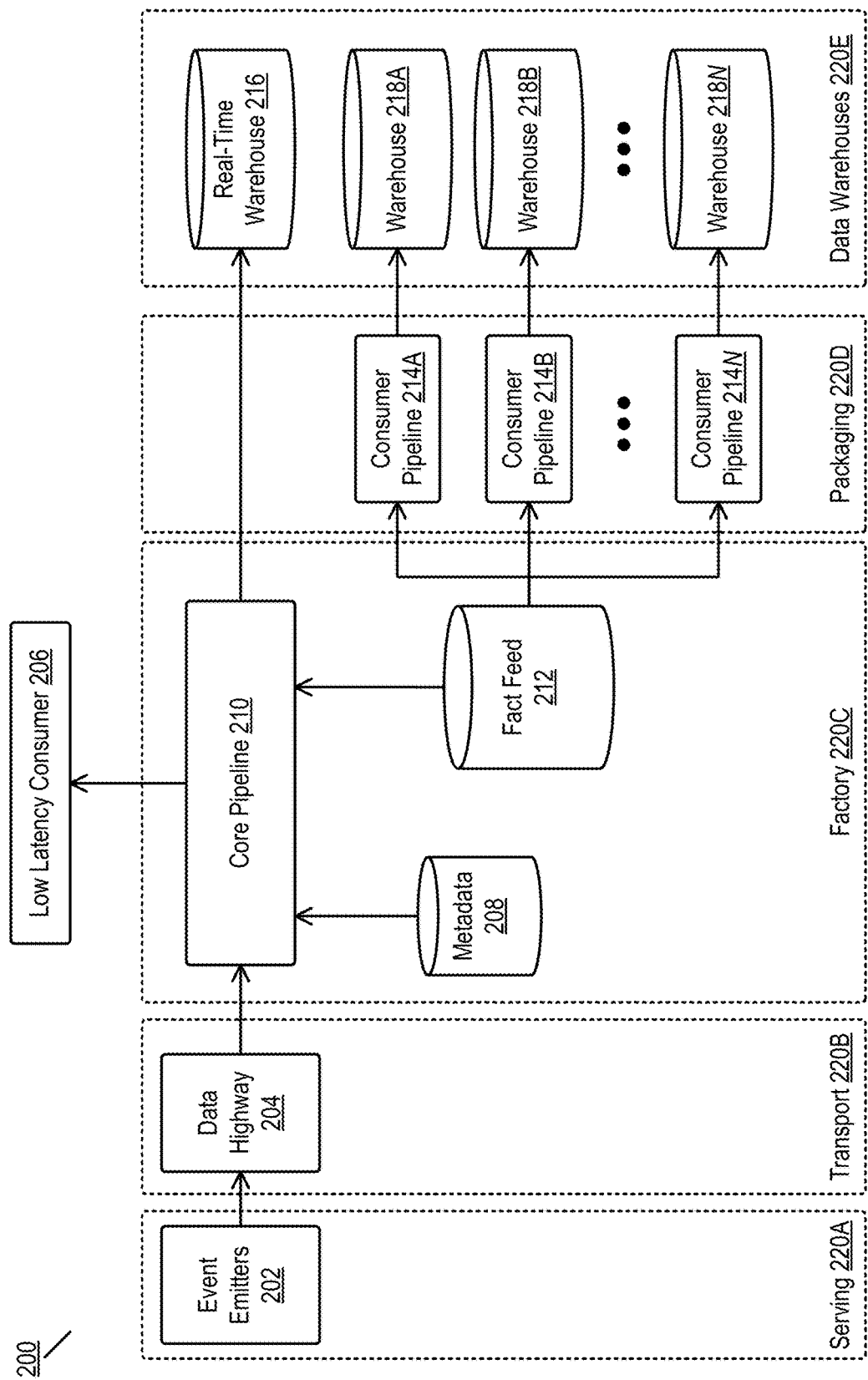
FIG. 2 is a block diagram illustrating a data processing system according to some embodiments of the disclosure.

FIG. 2 is a block diagram illustrating a data processing system according to some embodiments of the disclosure.

The illustrated system (200) segments the data processing into multiple logical layers. In some embodiments, these layers may also comprise physical layers, with each layer physically connected via a network interconnect. The illustrated layers comprise serving (220a), data transport (220b), pipeline factory (220c), packaging (220d), and warehousing (220e) layers.

The serving layer (220a) includes one or more event emitters (202). In the illustrated embodiment, these event emitters (202) can be similar or identical to the event emitters (102) discussed previously. As a few examples, the event emitters (202) can comprise systems including, but not limited to, ad servers, web servers, and beacon servers, that produce raw traffic events and send the events factory layer (220c) via the data transport layer (220b). In the illustrated embodiment, the data transport layer (220b) represents the previously described data transport (204). In the illustrated embodiment, the data transport layer (220b) comprises multiple network topologies and protocols that, when combined, deliver events to the factory layer (220c).

Figure 3:
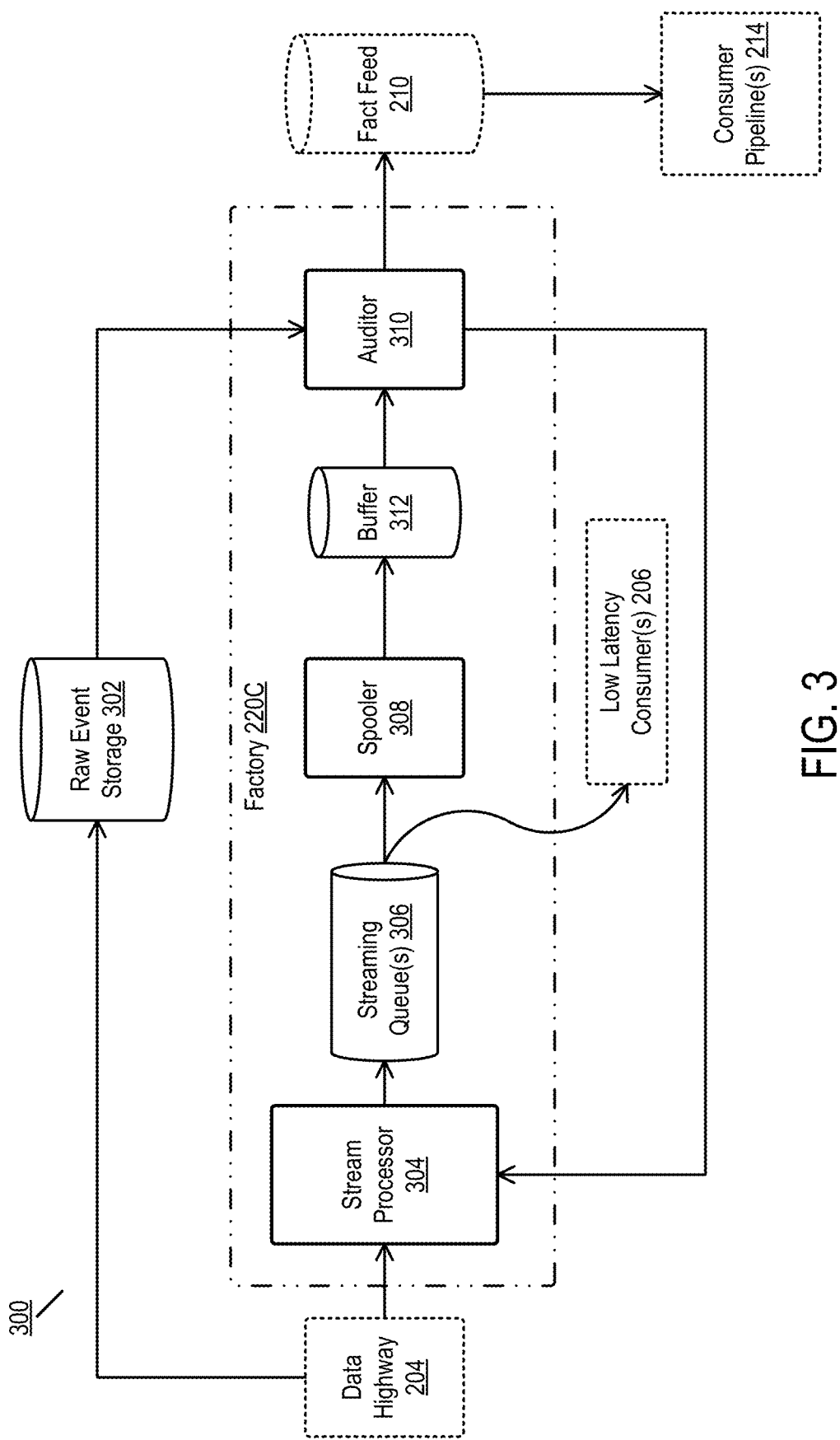
FIG. 3 is a block diagram illustrating a pipeline factory according to some embodiments of the disclosure.
Figure 4:
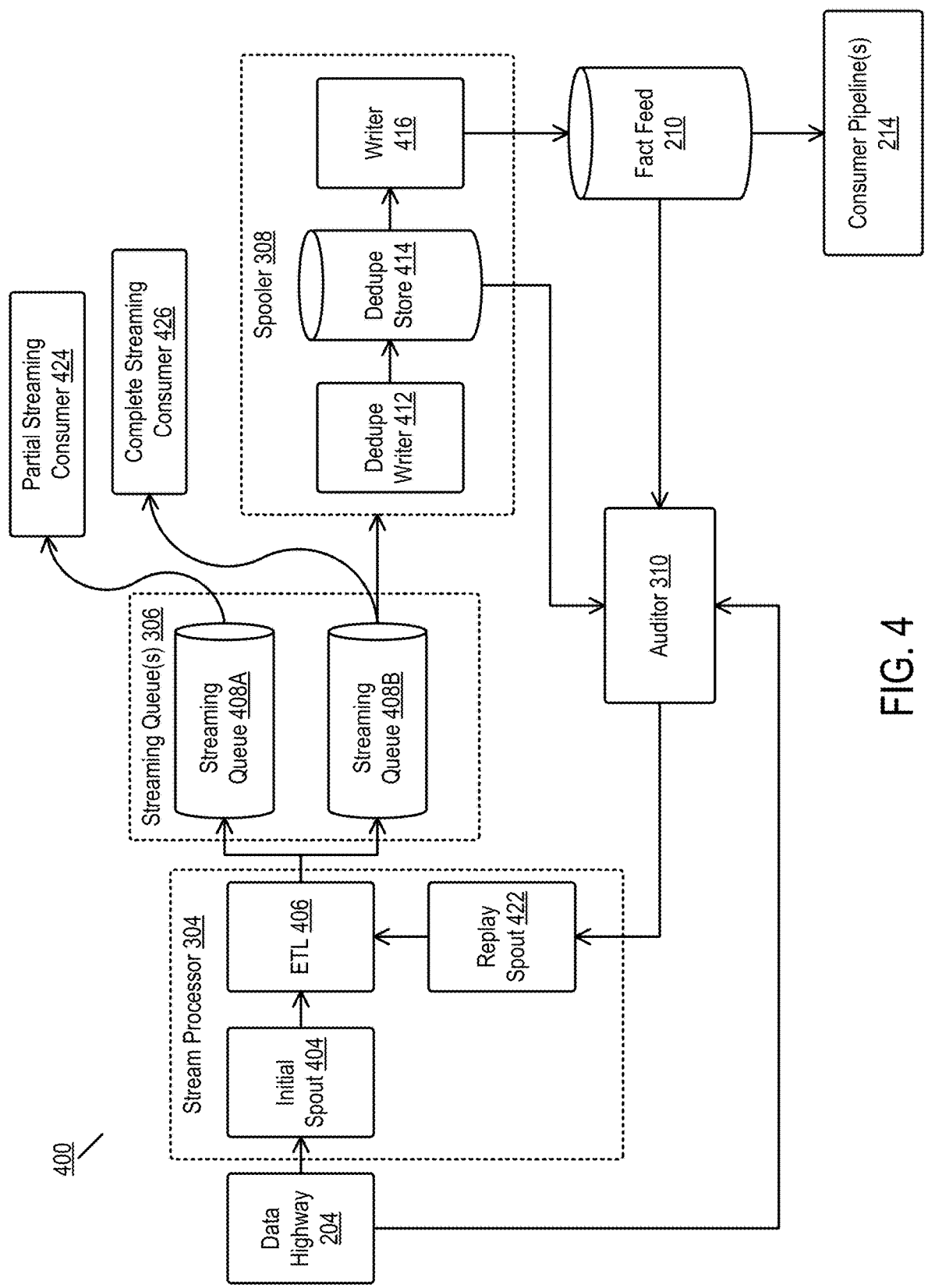
FIG. 4 is a block diagram illustrating a core pipeline according to some embodiments of the disclosure.

In the illustrated embodiment, the factory layer (220c) receives raw events from the data transport layer (220b) and processes the events via a core pipeline (210). The description of FIG. 3 provides further detail regarding the factory layer (220c), and the description of FIG. 4 provides further detail regarding the core pipeline (210). Thus, the following description of the factory layer (220c) only briefly describes the layer (220c) and the core pipeline (210), and FIGS. 3 and 4 present further detail.

The factory layer (220c) is responsible for doing the bulk of the processing of event traffic via the core pipeline (210). The following description describes exemplary processing operations performed by the core pipeline (210). The core pipeline (210) may perform some or all of the following operations as well as additional operations.

In one embodiment, in the serving (220a) and data transport (220b) layers, devices often compress and bundle data to conserve bandwidth. As a result, the core pipeline (210) may perform a parsing operation that unpacks or processes complex data structures (e.g., blobs) so that downstream consumer systems can access the data. Thus, as one example, the core pipeline (210) can detect that an incoming event was compressed using a gzip algorithm and may first unzip the event.

In another embodiment, the core pipeline (210) performs explosion operations. An explosion operation comprises unpacking composite events. For example, a multi-serve event comprises an event indicating that an end-user device received a set of content to be displayed. Thus, the multi-serve event comprises a data structure describing multiple items of content (e.g., advertisements). The core pipeline (210) may transform a single multi-serve event into multiple single-serve events such that each item of content in the event is associated with an independent event for later processing.

In another embodiment, the core pipeline (210) performs metadata annotation operations. As illustrated, the core pipeline (210) communicates with a metadata store (208). In one embodiment, the metadata store (208) comprises a data storage device such as a MySQL database or other type of relational database. In other embodiments, the metadata store (208) may comprise other types of data storage devices (e.g., a key-value data store). The core pipeline (210) accesses the metadata store (208) to perform dimensional annotation on incoming event data. As used herein, dimensional annotation refers to the augmenting of data with additional other data. For example, a content serving event may only a line item identifier identifying the served content. The core pipeline (210) may access the metadata store (208) and look up a parent insertion order, an advertiser identifier, and an organization for that line item identifier. The core pipeline (210) may then augment the line item identifier with this metadata to generate an annotated event. In this way, downstream consumer systems can group and aggregate based on the line item identifier.

In another embodiment, the core pipeline (210) performs traffic annotations. A traffic annotation comprises a complex join of an event with a prior event. For example, a click event may need to be joined with a first impression event to annotate the click with auction information or targeting information that is only available in the first impression.

In another embodiment, the core pipeline (210) performs arbitrary computations dictated by business logic. An example of this type of computation is a currency conversion. By doing the operation only once in the core pipeline (210), the system (200) can ensure consistency across all subsequent consumer systems, rather than requiring downstream consumer systems to implement the same rules and possibly arrive at different results.

In another embodiment, the core pipeline (210) validates incoming events. In this embodiment, the core pipeline (210) can filter events based on traffic conditions.

In another embodiment, the core pipeline (210) performs deduplication on incoming events. As discussed previously, the data transport layer (220b) may support "at least once" semantics. Alternatively, or in conjunction with the preceding, event emitters may allow duplicate events. Regardless of the source of duplication, the core pipeline (210) ensures that all events are processed and stored once and not duplicated. For example, the core pipeline (210) may allow more than one click event per impression event during a given period.

In another embodiment, the core pipeline (210) performs normalization on the received events. During a normalization operation, the core pipeline (210) "fits" an event to a particular schema or layout to facilitate reporting. This schema or layout is typically a standard field alignment and transformation.

Finally, in some embodiments, the core pipeline (210) performs a fast feedback operation. In this operation, the core pipeline (210) provides feeds or streams of data at very low latency to low-latency consumers (206) such as an ad serving budget control system. Typically, most consumer systems wait until the core pipeline (210) has completed all processing steps; however, some consumer systems are willing to sacrifice quality for timing. These specialty stages can be critical to some consumer systems.

In general, the core pipeline (210) processes events linearly: the quality of the event data increases as data passes from one processing operation to the next. Ultimately, after the core pipeline (210) applies all operations to the event data, the core pipeline (210) writes the processed event to one or more fact feeds (212). In the illustrated embodiment, a fact feed (212) comprises a log of every event that was received by the core pipeline (210) and any additional information that the core pipeline (210) annotates or computes. The fact feeds (210) become the source of truth for the entire system (200). By having the core pipeline (210) compute the fact feed (212) used by subsequent consumers pipelines (214a, 214b, 214n), the overall quality of the system (200) is improved.

Since the system uses a centralized fact feed (212), the core pipeline (210) never removes any field from an event. Additionally, the core pipeline (210) does not modify any raw field that it receives from the core pipeline (210) from the data highway (204). However, as one exception, the core pipeline (210) may replace null or empty fields with a static or default value, as this may assist downstream consumer systems (214a, 214b, 214n). In most embodiments, the core pipeline (210) does not attempt to "correct" or "fix" invalid values in an event. However, the core pipeline (210) may deviate from this requirement to recover from failed launches or bugs. In some embodiments, if the core pipeline (210) violates this requirement and fixes an invalid value in an event, the core pipeline (210) annotates the record with a flag so that a downstream consumer system can monitor the rule.

Importantly, the core pipeline (210) also ensures that no event is duplicated in the final fact feed (212). Thus, the core pipeline (210) never intentionally duplicates or allows duplicate events to result from the operations.

In the illustrated embodiment, the packaging layer (220d) comprises various consumer pipelines (214a, 214b, . . . 214n) retrieve or receive data from the fact feed (212). The packaging layer (220d) accesses the fact feed (212) and provides the processed events therein to downstream consumer pipelines (214a, 214b, . . . 214n). Whereas the factory layer (220c) is typically a complex, but linear processing stage, the packaging layer (220d) is typically composed of multiple parallel consumer pipelines (214a, 214b, . . . 214n). Consumer pipelines (214a, 214b, . . . 214n) are typically minimal, possibly single-stage pipelines that project and aggregate the events in the fact feed (212) for loading into a warehouse (e.g., 218a, 218b, . . . 218n) or similar system. The availability of the fact feed (212) triggers consumer pipelines (214a, 214b, . . . 214n), and thus the consumer pipelines (214a, 214b, . . . 214n) may run in parallel with one another.

In some instances, the consumer pipelines (214a, 214b, . . . 214n) are external to the factory layer (220c) and warehouse layer (220e). In other instances, the system (200) includes and controls the consumer pipelines (214a, 214b, . . . 214n). Alternatively, or in conjunction with the preceding, the warehousing layer (220e) may be external to the system (200). In various embodiments, the consumer pipelines (214a, 214b, . . . 214n) generally perform some or all of the following operations (or combinations thereof).

In one embodiment, the consumer pipelines (214a, 214b, . . . 214n) perform mapping and transformation operations. In these operations, the consumer pipelines (214a, 214b, . . . 214n) may require the data in a format different than the format of the fact feed (212). For example, the consumer pipelines (214a, 214b, . . . 214n) may map enumerated values (possibly in a lossy fashion) to fit a further downstream consumer data model.

In another embodiment, the consumer pipelines (214a, 214b, . . . 214n) perform projection operations. In some embodiments, consumer pipelines (214a, 214b, . . . 214n) will typically not require every field of the fact feed (212). Thus, the consumer pipelines (214a, 214b, . . . 214n) only ingest a small fraction of the available columns.

In another embodiment, the consumer pipelines (214a, 214b, . . . 214n) perform aggregation operations. In some embodiments, the consumer pipelines (214a, 214b, . . . 214n) aggregate facts and produce metric fields for efficient loading into a database or similar data store.

In another embodiment, the consumer pipelines (214a, 214b, . . . 214n) perform reverse annotation joins (e.g., right outer joins). In some embodiments, the consumer pipelines (214a, 214b, . . . 214n) perform join operations that cannot be implemented efficiently within the core pipeline (210). For example, a data science consumer pipeline may require a feed containing every impression event joined to any future click events recorded in the fact feed (212). Because this type of pipeline requires data collected over a long period before processing can begin, it would negatively impact all consumer pipelines (214a, 214b, . . . 214n) to wait. Therefore, the pipeline performs these joins in batch outside of the core pipeline (210).

In another embodiment, the consumer pipelines (214a, 214b, . . . 214n) perform rollup operations. In some embodiments, the consumer pipelines (214a, 214b, . . . 214n) may choose to create rollup feeds of the raw facts stored in fact feed (212). For example, the consumer pipelines (214a, 214b, . . . 214n) may create an hourly feed from a five-minute fact feed. The consumer pipelines (214a, 214b, . . . 214n) may perform this operation to use fewer filenames in a distribute filed system (e.g., the Hadoop Filesystem, HDFS) since such a file system collapses multiple files into larger single files. Further, the rollup may typically transform the data into a columnar format like Optimized Row Columnar (ORC) to promote faster ad hoc projection.

In another embodiment, the consumer pipelines (214a, 214b, . . . 214n) perform sketch operations. In some embodiments, as the consumer pipelines (214a, 214b, . . . 214n) generate aggregates, the consumer pipelines (214a, 214b, . . . 214n) may produce aggregate sketch columns to capture unique users or similar complex computations. The consumer pipelines (214a, 214b, 214n) can perform this expensive operation once on behalf of multiple end-users or downstream systems.

In another embodiment, the consumer pipelines (214a, 214b, . . . 214n) perform cleansing operations. In some embodiments, the consumer pipelines (214a, 214b, . . . 214n) may cleanse data in the fact feed (212) for a specific purpose. For example, cookies or personally identifiable information (PII) might need to be anonymized, or the consumer pipelines (214a, 214b, . . . 214n) may need to obscure data to enforce data visibility controls.

In some embodiments, the consumer pipelines (214a, 214b, . . . 214n) can be hierarchal. That is, a first consumer pipeline may perform one or more shared steps, and downstream consumer pipelines use the output of the first consumer pipeline as input.

After processing by consumer pipelines (214a, 214b, . . . 214n), each of the consumer pipelines (214a, 214b, . . . 214n) output further processed event data to respective data warehouses (218a, 218b, . . . 218n) in the warehousing layer (220e). The warehousing layer (220e) is generally the final stage of the system (200), where data is loaded into various systems to facilitate reporting, billing, or analysis. A data team may be responsible for various aspects of the warehousing, or it may be delegated to a data customer instead. Operations for a data team include loading, replication, and verification. In loading operations, the system (200) may need to load the data into a data warehouse (e.g., an Oracle or Druid data warehouse) or place the data onto a shared drop box or similar system. In replication operations, the system (200) may need to replicate a data feed to another data processing (e.g., Hadoop) cluster in a different co-location. In a verification operation, the system (200) may need to verify that the data loaded into a warehouse (218a, 218b, . . . 218n) accurately matches the original fact feed (210) (i.e. certify there was no data loss).

As illustrated, in some embodiments, data bypasses the packaging layer (220d). In these embodiments, the core pipeline (210) streams output directly to a real-time data warehouse (216). In the illustrated embodiment, the real-time data warehouse (216). In the illustrated embodiment, the system (200) may use a real-time data warehouse (216) for reporting or similar functions that do not require high data accuracy.

FIG. 3 is a block diagram illustrating a pipeline factory according to some embodiments of the disclosure.

In the illustrated embodiment, a data highway (204) delivers events from one or more event emitters (not illustrated) to a factory layer (220c) and raw event storage (302). The description of FIG. 2 provides further detail regarding the data highway (204) which is not repeated herein.

In the illustrated embodiment, the raw event storage (302) may comprise a distributed file system (e.g., HDFS). In one embodiment, the system (300) writes raw events to the raw event storage (302) as they are received. In some embodiments, the system (300) writes the raw events to raw event storage (302) in a batch mode. That is, the system (300) writes a separate file for each batch period (e.g., one hour), the file including all events received during that period. In some embodiments, not illustrated, external consumer systems can access the raw event storage (302) to perform batch processing. Thus, in some embodiments, the raw event storage (302) can be used to provide backwards compatibility with existing batch pipelines.

As illustrated, a stream processor (304) receives events from the data highway (204). In one embodiment, the stream processor (304) comprises a distributed stream processor. In one embodiment, the stream processor (304) comprises a streaming topology that defines data processing stages to perform on events.

One example of a stream processor (304) is an Apache® Storm topology. Briefly, a Storm topology is a graph of inputs and processing nodes. The topology receives events as input streams. Each event in the input stream comprises a tuple and the input stream itself is an unbounded series of such tuples. The topology receives streams from input sources, referred to as "spouts." The topology performs all processing in individual processing nodes, referred to as "bolts." The topology defines the input to a bolt as either a spout or another bolt. Thus, the topology defines connects between spouts and bolts. The output of one or more bolts forms the output of the topology.

In the illustrated embodiment, the stream processor (304) performs any or all of the processing operations described in the description of core pipeline (210) in FIG. 2. Details of these operations are not repeated herein. Importantly, the stream processor (304) ensures that a given event received over the data highway (204) is output at most once to the streaming queue(s) (306). Thus, during processing, the stream processor (304) detects and drops any duplicated events. FIG. 4 provides further detail regarding specific techniques for performing this detection and dropping.

As illustrated, the stream processor (304) outputs the processed and de-duplicated event stream to one or more streaming queues (306). In one embodiment, the streaming queues (306) comprise one or more Apache® Kafka queues. Since the event stream is processed by the stream processor (304), the data stored in the streaming queues (306) can be considered as source of truth for downstream consumers. Thus, a low-latency consumer system (206) can directly access the streaming queues (306). In this manner, the system (300) can simulate a fully streaming pipeline. As will be discussed, since the stream processor (304) processes the event stream and ensures that no records are dropped or duplicated, the simulated stream in the streaming queues (306) is more accurate than a raw event stream. Furthermore, as will be discussed, the output of the stream processor (304) includes the results of more complicated or advance operations (e.g., joins or dimensional annotation) which are not possible using traditional stream processing techniques.

A spooler (308) and auditor (310) use the output of the stream processor (304) to support advanced operations by the stream processor (304). FIG. 4 provides more detail regarding the spooler (308) and reference is made to that description.

In one embodiment, the spooler (308) comprises a second stream processor. The spooler (308) ensures that a one-to-one mapping between streamed data and data written to the fact feed (210) exists. The spooler (308) also ensures that streaming events retrieved from the queues (306) appears exactly once in the fact feed (210) (i.e., no events in the queues, 306, are duplicated). As such, the spooler (308) may comprise a separate stream topology similar to the stream processor (304). In contrast to the stream processor (304), the spooler (308) reads events from the streaming queues (306). Thus, the event stream to the spooler (308) comprises the processed events. As illustrated, prior to writing to the fact feed (210), the spooler (308) outputs to the auditor (310) via a buffer (312). In one embodiment, the output of the spooler (308) comprises a flat file (e.g., an HDFS file) and the buffer (312) comprises a distributed file system such as HDFS. In one embodiment, this flat file comprises a set of events occurring in a given batch period. Thus, the flat file simulates batch processing, but using the streaming events.

In the illustrated embodiment, an auditor (310) receives the output of the spooler (308). As described above, in some embodiments, the output of the spooler (308) comprises a batch file of events. In the illustrated embodiment, the auditor (310) also accesses raw event storage (302). In one embodiment, the format of the raw event storage (302) and the output of the spooler (308) are the same. For example, spooler (308) may write flat files to HDFS buffer (312) and raw event storage (302) may comprise raw events stored in the same type of file (e.g., HDFS). In the illustrated embodiment, the auditor (310) retrieves a batch file from buffer (312). In one embodiment, this batch file is associated with a fixed period. In some embodiments, this fixed period is represented in the filename or in metadata. Using this fixed period, the auditor (310) then retrieves a set of events from the raw event storage (302) matching the fixed period. In one embodiment, the periods of the buffer (312) and the raw event storage (302) are synchronized. In this embodiment, the auditor (310) then retrieves a single file from the raw event storage (302) that matches the period pulled from the buffer (312). In other embodiments, the auditor (310) may execute a MapReduce job to identify events split across multiple files. In this embodiment, the periods represented by files in the raw event storage are not synchronized with the buffer (312). Thus, the auditor (310) must patch together portions of multiple files stored in raw events storage (302) to rebuild a period of raw events matching the period stored in the buffer (312). In either event, the auditor (310) receives two files containing raw events from raw event storage (302) and a set of processed events for the same period stored in buffer (312).

In general, the auditor (310) ensures that each processed event in the buffer (312) matches a raw event stored in raw event storage (302). Thus, the auditor (310) ensures that no events were dropped during processing by the stream processor (304) and that no events were duplicated. If the auditor (310) detects that an event exists in the raw event storage (302) and does not exist in the corresponding buffer (312) output, the auditor (310) sends the missing event back to the stream processor (304) for re-processing.

The stream processor (304) reprocesses the events using the same processing logic used to process the event originally. In some embodiments, the stream processor (304) may add a field to the reprocessed event to indicate it was (or will be) reprocessed. In most embodiments, the stream processor (304) will properly process the event during re-processing. However, if the stream processor (304) cannot reprocess the event (as detected by the auditor, 310), the system (300) may gracefully handle the error. In one embodiment, the auditor (310) can itself add a field to the raw event indicating that the raw event was not processed and write the event along with the processed events.

After any missing events are re-processed, the auditor (310) writes the final output to the fact feed (210). Since spooler (308), buffer (312) and auditor (310) operate on batches of events, the fact feed (210) comprises a simulated batch data store. In some embodiments, the auditor (310) will delay writing to the fact feed (210) until any events are re-processed. In other embodiments, the auditor (310) writes the partially final output file to the fact feed (210) and updates the file upon completing the re-processing.

FIG. 4 is a block diagram illustrating a core pipeline according to some embodiments of the disclosure. Various elements of FIG. 4 are described in the previous figures and those elements are not described again herein.

In the illustrated embodiment, a stream processor (304) receives events from a data highway (204). In the illustrated embodiment, the stream processor (304) receives events from the data highway (204) via an initial spout (404). The stream processor (304) as illustrated includes two separate spouts (404, 422). In the illustrated embodiment, the stream processor (304) utilizes two spouts (404, 422) to distinguish between event streams (e.g., original versus re-processing). In the illustrated embodiment, the stream processor (304) topology can be configured to add additional extract-transform-load (ETL) steps (e.g., bolts) for the reprocessing spout (422) versus events received via the initial spout (404).

In the illustrated embodiment, the stream processor (304) processes events received via spouts (404, 422) via ETL logic (406). As described previously, ETL logic (406) may comprise a series of linear processing stages (e.g., bolts) for each operation performed on events.

In the illustrated embodiment, the ETL logic (406) outputs processed events to two streaming queues (408a, 408b). In one embodiment, the two queues (408a, 408b) store varying types of event data. As illustrated, a first queue (408a) is accessed by a partial stream consumer system (424). In the illustrated embodiment, the first queue (408a) may be filled by the ETL logic (406) prior to the execution of all processing steps. In the illustrated embodiment, the ETL logic (406) may eschew more complicated and time-consuming operations and interrupt the full processing steps to provide low latency operations. In some embodiments, this bypassing includes foregoing joins, traffic protection, annotation, etc. In the illustrated embodiment, the partial stream consumer system (424) may comprise a fast feedback system such as budget or pacing systems that are willing to accept a certain level of error. Thus, the first queue (408a) provides "best effort" data wherein the system (400) does not guarantee the accuracy of the data. In practice, however, the system (400) will generally process a large amount of data correctly enough that the best effort data in the first queue (408a) is of value to the partial stream consumer system (424).

In contrast to the first queue (408a), the stream processor (302) fills the second queue (408b) with the results of the full ETL processing. Thus, the ETL logic (406) fully processes the data in the second queue (408b), including performing joins, deduplication, annotations, fraud detection, traffic protection, etc. In one embodiment, the complete streaming consumer system (426) access second queue (408b) can retrieve data that achieves close to exactly once performance (that is, no events are dropped or duplicated) since the data was fully processed in the ETL logic (406). In some embodiments, this performance will meet "exactly once" performance. However, in other embodiments, the output of the second queue (408b) is still subject to inaccuracies caused by the underlying messaging queue. In some embodiments, a near exactly one completeness from second queue (408b) comprises a 99.9% guarantee of completeness. Such a confidence level is often suitable for applications such as real-time reporting.

Finally, as illustrated and discussed above, a final fact feed (210) meets exactly once requirements of all systems and provide batch-like performance. That is, data in the fact feed (210) will be fully de-duplicated and ensure that no events were dropped. As discussed in FIG. 3, this guarantee is implemented via spooler (308) and auditor (310). Auditor (310) is described more fully in FIG. 3 and those details are incorporated herein by reference.

In the illustrated embodiment, the spooler (308) is illustrated as including deduplication writer (412), deduplication store (414), and a fact feed writer (416).

In the illustrated embodiment, the deduplication writer (412) receives events from the second queue (408b). An event is uniquely identified by an event identifier (event_id). The spooler (308) considers two events as duplicates if they have the same event identifier. Events may include additional, but standardized, fields such as a type, timestamp, join status, and secondary event identifiers.

The deduplication writer (412) writes each of the events to deduplication store (414). In one embodiment, the store (414) comprises a database such as HBase or a similar storage device. Upon receiving an event, the writer (412) analyzes the fields associated with the event. If the event includes one or more secondary event identifiers, the writer (412) will retrieve all events stored in store (414) matching these secondary event identifiers and update the entries to indicate that a primary event is available (i.e., will be written to the store, 414). The writer (412) will then write the received event to the store (414) using the event identifier as a key. In some embodiments, a salt will be added to the event identifier before using the event identifier as a key. In the illustrated embodiment, the writer (412) will not write the event if the event has secondary event identifiers and the initial step of updating the secondary events is not successful. In some embodiments, the writer (412) will serialize the event prior to writing the event as a value for the event identifier key.

In the illustrated embodiment, the deduplication store (414) stores events per batch period and per type of event. In some embodiments, the store (414) creates a new table for each event type and batch period pair for a fixed period of time (e.g., one week) since the current time. The store (414) additionally includes a pruning process that periodically inspects the created tables and removes older tables not occurring within the current period (e.g., older than one week). In some embodiments, the auditor (310) initiates this pruning process upon confirming that all data for a given period is certified.

The spooler (308) additionally includes a fact feed writer (416). In the illustrated embodiment, the fact feed writer (416) waits for a signal from auditor (310) to trigger a spooling process to write the events in the store (414) to the fact feed (210) for a particular batch period and event type. In one embodiment, the fact feed writer (416) includes an internal web server that comprises a Hypertext Transfer Protocol (HTTP) endpoint that is called by the auditor (310) to initiate the spooling. As described above, once the auditor (310) confirms that the data in the store (414) is fully processed and certified, the auditor (310) issues a call to the endpoint which causes the writer (416) to start writing to the fact feed (210). In one embodiment, the writer (416) executes a distributed process routine to per from a full table scan of the store (414) and write the events to the fact feed (210).

For each event in the store (414), the writer (416) will deduplicate the events prior to writing. In one embodiment, the writer (416) will first determine if an event has one or more secondary identifiers and whether that secondary event was successfully joined to the event under inspection. If so, the writer (416) will select the most recent secondary event and write that joined event to the fact feed (210). Alternatively, if the event under inspection indicates that a primary event is available, the writer (416) will skip the event (since a root event exists). Finally, if the event does not have secondary identifiers and the primary event flag is not raised, the writer (416) will write out the event as failed since the secondary event was not properly joined.

In some embodiments, low-latency consumers may not want to or be able to consume a low-latency stream (408a) directly. For example, the stream might contain personally-identifiable fields that need to be restricted to specific consumers or the final consumer may need additional processing of events for their use. As another example, the consumer may be consuming from many sources and is unable to handle different event schemas of their various inputs. In these scenarios, the system (400) provides derived low-latency streams, or "filters", that have all of the events (or at least all of the desired events) as the second queue (408b) stream. Each filter can be associated with a quality of service (QoS) level. In the illustrated embodiment, three QoS levels are provided: "at least once", "at most once", and "at least once with tag."

A filter having an at least once QoS outputs every event but potentially includes duplicates. In the event of a system (400) failure, the at least once filter resends previously-sent events. A filter having an at most once QoS does not include duplicates but potentially drops data. The at most once filter does not reprocess the same event batch more than once.

Finally, a filter having an at least once with tag QoS generates batch dataset wherein each event in the batch includes tags allowing downstream consumer systems to detect duplicates. In one embodiment, this filter includes a stream topic, partition, and a "cursor," that can be used to detect duplicates. In some embodiments, Kafka offsets and CMS Message Ids could provide such cursors. The consumer system is then responsible for keeping track of the last cursor it processed, and discard any subsequent batch with a cursor less than or equal the new batch. This requires a 1-to-1 correspondence between batches in the pipeline and derived streams.

Each of the above filters may be implemented via a separate stream processor (e.g., stream topology). In these embodiments, the filters utilize an output of the system (400) (e.g., queues 408a, 408b) as an input source (e.g., spout) and output the filtered feed.

For the at least one filter, the filter will always back up in the event of a failure and resend any events that cannot be confirmed as being successfully delivered. This filter uses the initial spout (404) and streaming queue (408b) as inputs (e.g., filter spouts). In this embodiment, the consumer is configured to not report its current read offset. When sending data, the filter spout includes the current events cursor in a message identifier. The receiver (e.g., sink) would then acknowledge the received message only after successfully delivering the filtered output to the derived stream. In some embodiments, the receiver could also use the existing spooler logic to fail a tuple if it can't deliver it, and then continue to fail subsequent tuples until it receives a restarting indication from the spout. Upon receipt of an acknowledgement, the filter spout would commit that cursor back to the system (400). On receipt of a fail of a sent event, the filter spout would back up the received offset to a cursor at or before the last acknowledged event and restart sending.

For the at most once filter, the filter spout enables automatically committing offsets in a stream queue. By turning on auto-commitment, the filter spout only transmits a given event once and does not re-transmit events causing duplication.

For the at least once with tag filter, the at least one filter mechanism can be used. However, in this filter, tags will be added prior to transmission to the consumer. These tags include the cursor, as described above, but also a topic and partition if they aren't implied by the derived stream's partition.

In some embodiments, an exactly once filter may be implemented based on the at least once with tag filter. In this embodiment, a receipt acknowledgement message can be saved as reliably as the system (400) can support. Additionally, the filter, on receipt of the acknowledgement, could update some persistent record of the delivered cursor. However, persisting this data may be computationally expensive and require significant storage. In an alternative embodiment, given the at least once with tag filter, the filter, on a start-up or after a failure, can access the output stream and read back a plurality of last-sent messages in the queue. The filter could then determine the tag of the last message written, then discard any replayed events from the spout until it was caught up, thus ensuring exactly once delivery.

As illustrated in FIGS. 3 and 4, the input to the spooler (308) is a streaming queue (e.g., a Kafka queue) while the output of the spooler (308) comprises data for a fact feed (210). As discussed, this fact feed (210) may be implemented as a distributed file system (e.g., HDFS). As will be descried in more detail herein, the spooler (308) is designed to provide exactly-once delivery of events to the fact feed (210) even in the event of failures. In contrast to existing pipelines, the illustrated spooler (308) performs this function while writing to the fact feed (210) and not as a separate batch process. In contrast, existing architectures generally utilize a separate batch processing system to ensure that events are not dropped or duplicated (i.e., are delivered exactly once). The following Figures provide further detail on the implementation and operation of the spooler (308).

Figure 5A:
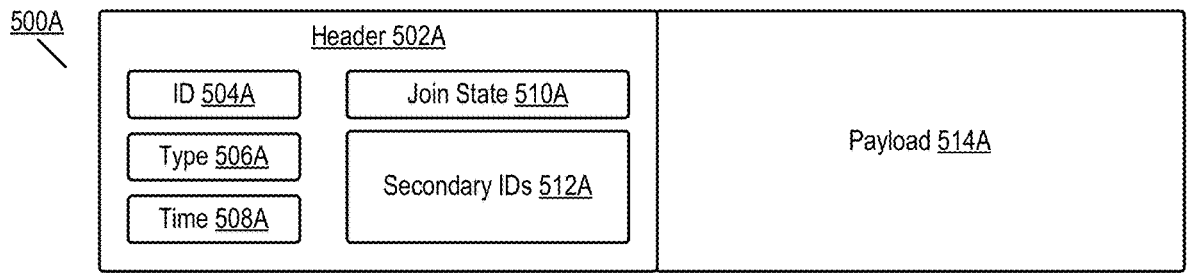
FIG. 5A is a block diagram of an event according to some embodiments of the disclosure.

FIG. 5A is a block diagram of an event according to some embodiments of the disclosure. In the illustrated embodiment, the event (500a) comprises an event emitted by the stream processor (304) and queued in the streaming queue (408b).

In the illustrated embodiment, the event (500a) comprises a data structure having a header portion (502a) and a payload (514a). In the illustrated embodiment, the payload (514a) can comprise any type of data including structured data (e.g., serialized data) or unstructured data (e.g., binary or blob data). The disclosure places no limits on the type of data that may be used. As one example, the data in payload (514a) may comprise data relating to a click event detected by a browser or mobile device or the transmittal (i.e., serving) of content to the mobile device or browser. As will be discussed, these two events may be related.

The header (502a) of the event (500a) includes various fields (504a, 506a, 508a, 510a, 512a). Some fields (e.g., 504a, 506a, 508a) are present for all events. In some embodiments, the join state field (510a) is only present on secondary events while the list of secondary identifiers (512a) is only present for primary events.

The header (502a) includes an identifier (ID) field (504a). In one embodiment, the ID field (504a) may be set by an event emitter (202). In other embodiments, the ID field (504a) may be set by the system (300, 400) at point of ingress (e.g., by stream processor, 304). In general, the ID field (504a) comprises a suitably unique data value such that each unique event can be assigned a unique identifier.

The header (502a) additionally includes a type field (506a). In one embodiment, the type field (506a) comprise an enumerated value indicating the type of the underlying event. In some embodiments, this type field (506a) may comprise an integer value or may comprise symbol or other type of fixed value. Examples of event types include click and serve events in an advertising system.

The header (502a) additionally includes a time field (508a). In one embodiment, the time field (508a) comprises a timestamp associated with the event. In one embodiment, this timestamp is set by the event emitters (202). In some embodiments, the data highway (204) may be configured to supply the timestamp if the event emitters (202) do not provide a timestamp.

The header (502a) additionally includes a join state field (510a). In one embodiment, the join state field (510a) comprises an enumerated status field representing whether the event (500a) was joined. In one embodiment, the join state field (510a) is set by the stream processor (304) during stream processing. In one embodiment, the join state field (510a) can be set to FAILED (a join was attempted and filed), IN_ORDER_SUCCESS (the secondary join event was received after the primary join event), or OUT_OF_ORDER_SUCCESS (the secondary join event was received before the primary join event but was nevertheless successfully joined).

Finally, the header (502a) includes a list of secondary identifiers (512a). In one embodiment, this list of secondary identifiers (512a) comprises a list of tuples, each tuple comprising an event type (as described with respect to field, 506a) and an event identifier (as described with respect to field, 504a). In one embodiment, the secondary identifiers (512a) comprise events that are joined with the event (500a).

Figure 5B:
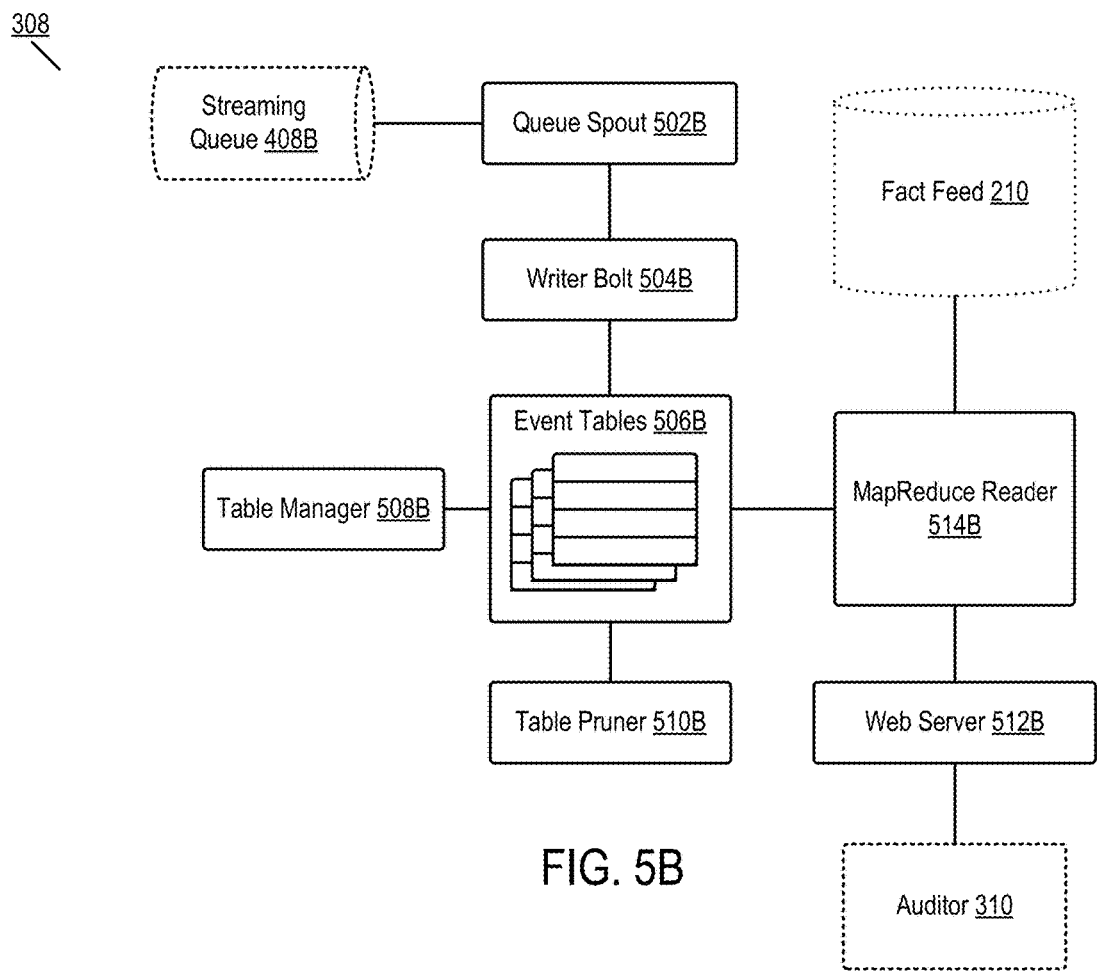
FIG. 5B is a block diagram of a spooler according to some embodiments of the disclosure.

FIG. 5B is a block diagram of a spooler according to some embodiments of the disclosure. In the illustrated embodiment, the spooler (308) corresponds to the spooler (308) described previously. The overall description of spooler (308) is not repeated herein. The following description provides further detail regarding the components of the spooler (308).

As described in the preceding Figures, the spooler (308) receives data via a stream queue (408b), such as an Apache® Kafka queue. In one embodiment, the output of the stream processor (304) comprises a joined event input onto the queue (408a). The spooler (308) includes a separate stream processor that uses the output of the queue (408a) as an input for processing. In the illustrated embodiment, queue spout (502b) comprises an input source for the spooler (308). In one embodiment, the spout (502b) may be implemented using a KafkaSpout using the Apache® Storm application programming interface (API).

The spout (502b) streams events from the queue (408b) to a writer bolt (504b). In one embodiment, the writer bolt (504b) comprises a processing node implemented in a stream processor. In the illustrated embodiment, the writer bolt (504b) receives the events and writes the events to the event tables (506b) after processing the events. In one embodiment, the writer bolt processes the events prior to writing them to the event tables (506b). In brief, the writer bolt (504b) includes flagging events as primary events when appropriate. Further detail on the processes performed by the writer bolt (504b) are described more fully in the description of FIG. 6D. Although illustrated as a single write bolt (504b), the spooler (308) may employ multiple writer bolts. In this embodiment, the spooler (308) may include a writer bolt for each type of event.

In the illustrated embodiment, the event tables (506b) may comprise a set of distributed database tables. In one embodiment, the event tables (506b) are stored using HBase or a similar distributed database, although other types of relational and non-relational databases may be used.

As illustrated, the spooler (308) includes a table manger process (508b) and a table pruner process (510b). These two processes (508b, 510b) manage the state of the event tables (506b) and may be executed independently of the writer bolt (506b). In some embodiments, these two processes (508b, 510b) may execute periodically based on the simulated batch time of the system. Details of these processes (508b, 510b) are described in more detail in FIGS. 6B and 6C, respectively, and reference is made herein to the descriptions of those Figures.

In the illustrated embodiment, a reader process (514b) communicates with the event tables (506b). In the illustrated embodiment, a web server (512b) initiates the reader process (514b). In one embodiment, the process (514b) comprises a MapReduce process, however other types of processes may be used.

In the illustrated embodiment, the web server (512b) receives HTTP requests from the auditor (310). In one embodiment, the auditor (310) issues HTTP requests upon determining that data should be written or flushed to the fact feed (210). Details of the processes performed by the auditor (310) to issue these requests can be found above and are not repeated herein.

Upon detecting an appropriate HTTP request, the web server (512b) initiates the reader process (514a). In response, the reader process (514a) iteratively accesses each event in the event tables (506b) and writes the events to the fact feed (210) upon confirming that the events should be written. Details of the reader process (514b) are described more fully in the description of FIG. 6e and are not repeated herein.

FIG. 6A is a flow diagram illustrating the operation of a spooler according to some embodiments of the disclosure.

In step 602a, the method (600a) receives a message from a queue spout. In one embodiment, the messages from the queue spout may include a single event or multiple events. As described above, the queue spout receives events from a stream queue (such as Apache® Kafka). In some embodiments, the method (600a) receives messages from the queue spout in a streaming manner and thus the method (600a) may some of the steps (e.g., 604a and 606a) using a stream processor. Other steps (e.g., 608a, 610a, 612a) may be performed using a distributed processing framework. Thus, in some embodiments, the method (600a) is performed using a hybrid stream and batch processing system.

In step 604a, the method (600a) extracts events from the messages. In some embodiments, step 604a is optional. However, if a stream queue bundles events into individual messages, the method (600a) performs this pre-processing step to generate a stream of individual events for processing.

In step 606a, the method (600a) writes events to relevant tables in a distributed database. This step 606a is described in more detail in the description of FIG. 6D, which is not repeated herein. In brief, as part of step 606a, the method (600a) updates the state of the entire distributed database based on contents of the incoming event. Specifically, the step 606a includes updating join statuses of all events prior to writing an incoming event into the distributed database.

In step 608a, the method (600a) receives a close of books (COB) signal. As used herein, a COB refers to the end of a batch interval, after all events have been certified. In general, a COB refers to the time when a given set or batch of events is certified for downstream use. As described above, the COB may be signaled by the auditor after the facts in the spooler have been confirmed to correspond to the raw facts.

As illustrated in FIG. 6A, step 608a may be performed in a separate thread of control. That is, steps 602a through 606a may be executed in an infinite loop while processing in step 608a may be initiated at any time when a COB signal is triggered.

In step 610a, the method (600a) deduplicates the event tables. Step 610a is described more fully in the description of FIG. 6E and that discussion is not repeated herein. In general, the method (600a) decides whether to discard an event in the event tables based on the join status updated during the write process.

In step 612a, the method (600a) writes the deduplicated events to a persistent storage device such as a distributed file system. In one embodiment, the method (600a) outputs the events in a given batch interval to a temporary location while writing to the file system is in progress. Once the spooling is complete for a given batch interval and event type, the temporary location can be atomically renamed to the final output location and is set to be immutable. This allows consumers to see the fact feed only once the feed is fully ready for consumption.

FIG. 6B is a flow diagram illustrating a table creation process executed by a spooler according to some embodiments of the disclosure.

In some embodiments, the method (600b) creates a plurality of tables for storing events received from a stream processor. In one embodiment, the events are stored per batch interval (e.g., in five-minute increments) and also per event type. Thus, the method (600b) is configured to create new database tables for each tuple (EventType, BatchTime) for a preconfigured interval. As one example, the method (600b) may create these tables for a week worth of batch intervals. In some embodiments, the method (600b) is performed at regular intervals (e.g., once a day). In some embodiments, the method (600b) is scheduled using a workflow scheduler system (e.g., Apache® Oozie).

In step 602b, the method (600b) identifies existing tables. In one embodiment, the method (600b) can issue a command to the database cluster requesting a list of table names. In some embodiments, the table names include both the event type and the batch interval. Thus, in these embodiments, the table names are formatted "events_<EventType>_<BatchTime>." Thus, in the illustrated embodiment, the method (600b) does not access the underlying data (which is computationally expensive) but only retrieves metadata associated with the database, reducing processing time. In an alternative embodiment, the database may store a separate mapping table that maps an EventType, BatchTime tuple to a table name. In this manner, the method (602b) can perform an O(1) lookup of a table name based on an event type and batch time. In step 602b, the method (600b) is performed at a regular scheduled interval and thus will attempt to query whether a set of event tables exist for a set of batch times. By using a lookup table, the method (600b) can quickly execute this operation in constant time.

In step 604b, the method (600b) synthesizes one or more new tables. As discussed above, the method (600b) executes at preconfigured intervals and attempts to create all needed tables for a given time period. In step 602a, the method (600b) first identifies the existing tables and then computes additional tables needed. As one example, a database may store tables for two events in five-minute intervals. Further, the spooler (308) may be configured to ensure that a weeks' worth of tables is available. If the method (600b) runs at the same time, each day, the method (600b) will consistently identify a days' worth of missing tables (e.g., 576 tables). Thus, in step 604b, the method (600b) creates this set of missing tables based on the number of event types and the amount of time expired since last run. As will be discussed, the previous example is not limiting as a pruning process (600c) may run out of sync with the creation process (600b). Thus, the number of tables needed to be created may vary at each run. Thus, the method (600b) in step 604b uses the active results of querying the available tables to determine the number of tables to synthesize.

In step 606b, the method (600b) creates new tables based on the synthesize tables. In some embodiments, steps 604b and 606b may be combined. In the illustrated embodiment, step 606b comprises the actual creation of the missing tables synthesized (e.g., identified) in step 604b. In one embodiment, step 606b comprises issuing one or more commands to the distributed database to create the missing tables. In some embodiments, this command is transactional and will be retried if the any of the individual tables are not successfully created.

Thus, at the end of method (600b), the event tables are created and initialized (e.g., zeroed out) for a given prospective time period (e.g., the next week) which reduces the workload on the writer bolt of the spooler. As will be discussed next, a pruning process runs in parallel with the creation process (600b) to manage the state of the distributed database.

FIG. 6C is a flow diagram illustrating a table pruning process executed by a spooler according to some embodiments of the disclosure.

In step 602c, the method (600c) detects that a close of books (COB) has been triggered. As used herein, a COB refers to the end of a batch interval, after all events have been certified. In general, a COB refers to the time when a given set or batch of events is certified for downstream use. As described above, the COB may be signaled by the auditor after the facts in the spooler have been confirmed to correspond to the raw facts.

In step 604c, the method (600c) receives an event type and batch time. In some embodiments, this step comprises the initiation of the process and is implemented via an interface. In one embodiment, the spooler initiates the process by transmitting a given event type and batch time. In some embodiments, step 604c may not be executed immediately after step 602c but may be initiated after a pre-configured delay (e.g., two hours).

In most embodiments, step 604c is issued multiple times. For example, the method (600c) may detect the COB and identify all batch intervals (e.g., five-minute intervals) appearing in the database prior to the time of the COB. The method (600c) may then identify all types of events in the database. Next, the method (600c) may generate a series of tuples for each event type, each tuple in the series corresponding to an identified batch interval. As described in FIG. 6B, this process may utilize the metadata stored by the distributed database.

In step 606c, the method (600c) queries the database to identify tables matching the event type and batch times. In one embodiment, the method (600c) provides the event types and batch time tuples to the database and the database uses the mapping table to provide a list of table names corresponding to the candidate tuples.

In step 608c, the method (600c) drops the identified tables. In one embodiment, the method (600c) uses the table names returned in step 606c to generate one or more commands to drop the tables corresponding to the table names. In some embodiments, this command may be executed as an atomic transaction. In this manner, the method (600c) can drop all tables that include events that have been certified by the auditor and are thus not needed for future processing.

Figure 6D:
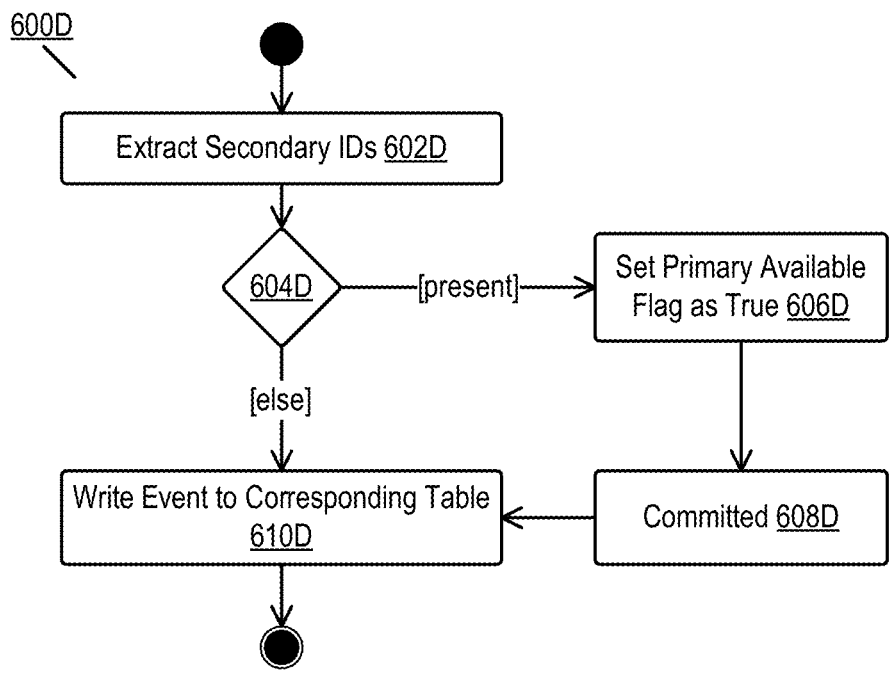
FIG. 6D is a flow diagram illustrating a method for writing an event to a distributed database according to some embodiments of the disclosure.

FIG. 6D is a flow diagram illustrating a method for writing an event to a distributed database according to some embodiments of the disclosure.

In step 602d, the method (600d) extracts any secondary identifiers from a given event. In the illustrated embodiment, the method (600d) analyzes the header of the given event and extracts the list of secondary identifiers discussed in FIG. 5A.

In step 604d, the method (600d) determines if any secondary identifiers were present in the given event. If the given event is a primary event this list includes a set of events that were joined to the primary event. If the given event is a secondary event (e.g., an event to be joined to a primary event), the list of secondary identifiers will be empty. The illustrated method (600d) thus branches based on whether the event is a primary event or a secondary event.

In step 606d, the method (600d) sets a primary available flag to true for any event associated with the secondary identifiers. In the illustrated embodiment, prior to executing step 606d, the method (600d) determines that the given event includes a list of secondary identifiers. Thus, the method (600d) determines that the given event is a primary event or a secondary event based on the presence of absent of the secondary identifiers.

As discussed above, events processed by the spooler (308) may include primary and secondary events. The system is configured to not drop any events to ensure integrity of the data. Thus, when a primary event and secondary event (to be joined) are processed by the stream processor (304), the stream processor will output both events. Additionally, the stream processor (304) will annotate one of these events if a join was successful. Thus, the distributed data of the spooler will include both primary and secondary events. Using the example of a click event (secondary) and a serve event (primary), the distributed database will store both events and if the join was successful, the click event will be populated with the relevant serve event data.

In step 606d, the method (600d) receives a primary event and may have received one or more secondary events. Thus, in step 606d, the method (600d) updates records associated with any secondary events to indicate that the primary event is also available in the distributed database. In the illustrated embodiment, this is accomplished via a Boolean flag indicating whether the primary event is available. In this manner, secondary events that are not associated with a primary event (referred to as "lonely" events) can be quickly and easily identified. In the illustrated embodiment, the method (600d) performs step 606d for each secondary identifier identified in the given event header and present in the database.

In step 608d, the method (600d) awaits committing of step 606d. In the illustrated embodiment, the method (600d) only proceeds once the updating of secondary event records is complete, thus ensuring the integrity of the update. In other words, step 606d comprises a transactional update whereby the operation can be rolled back in the event of failure and retried (or otherwise handled).

In step 610d, the method (600d) writes the given event to a corresponding table. As illustrated, the method (600d) may execute step 610d if no secondary identifiers are associated with a given event.

In the case where the given event is primary event, the method (600d) will update the records in the tables associated with the secondary events (step 606d). After confirm that this update was successful, the method (600d) will only then write the given event to the distributed database. However, if the given event was not a primary event, the method proceeds to write the secondary event directly to the database. Certainly, if the associated primary event is received at a later date, the method (600d) will update this secondary event as discussed above.

In the illustrated embodiment, the method (600d) selects a table to write the given event to as part of step 610d. As described previously, the distributed database may include a plurality of tables, each table associated with an event type and a batch interval. In the illustrated embodiment, the method (600d) extracts an event type from the header of the given event and extracts a timestamp from the header. The method (600d) uses these two values to construe the table name. In one embodiment, the method (600d) can issue a query to the database to retrieve a table name based on an event type and timestamp parameter. In some embodiments, the method (600d) can automatically generate a table name based on a preconfigured batch interval.

In some embodiments, the given event may already be present in the distributed database. In some embodiments, the incoming streaming queue may duplicate events, thus resulting in this anomaly. In these scenarios, the method (600d) will write the given event to the same database cell that the duplicate event is currently occupying. The method (600d) will additionally add a version identifier to the given event. In some embodiments, the version comprises a timestamp or may comprise an incrementing integer value.

Alternatively, or in conjunction with the foregoing, the method (600d) may batch the write operations to insert the given event with a batch of other events. This embodiment may be optional and primary reduces the network traffic with the distributed database.

Figure 6E:
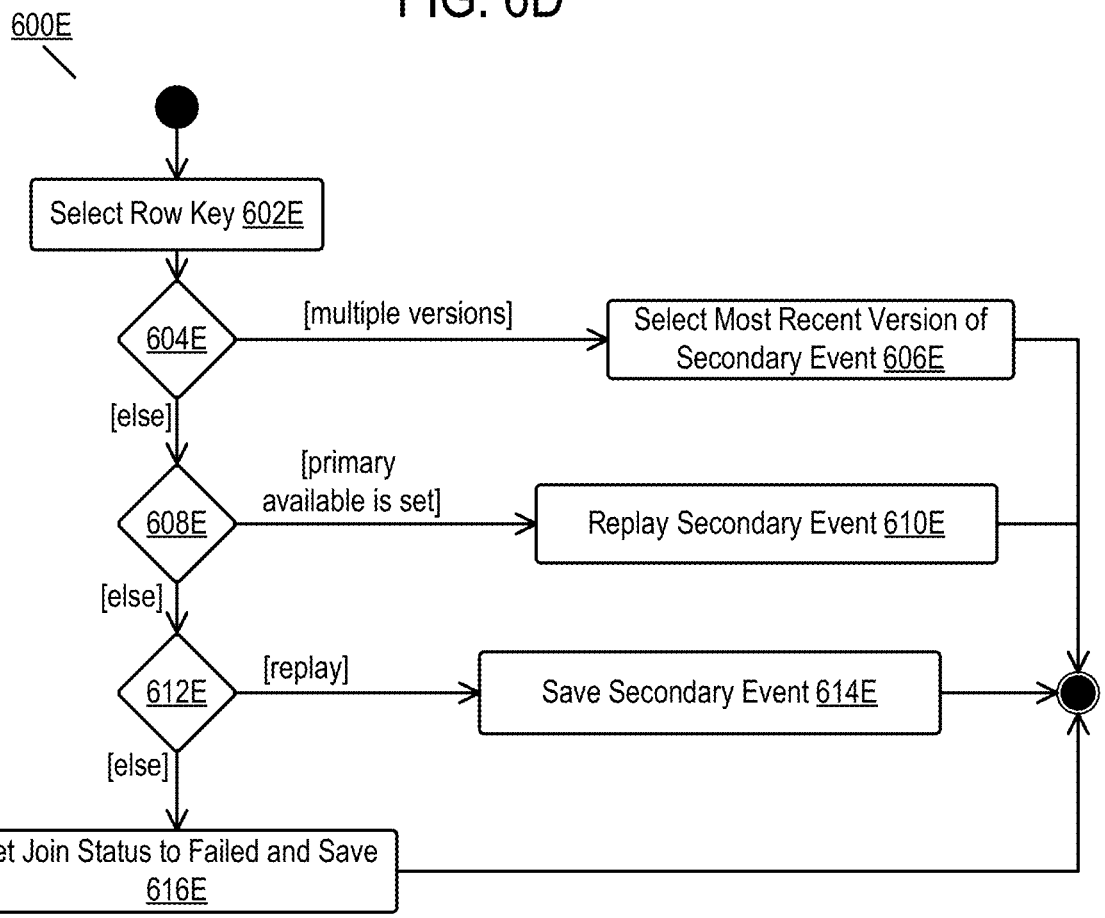
FIG. 6E is a flow diagram illustrating a method for spooling events to a file system according to some embodiments of the disclosure.

FIG. 6E is a flow diagram illustrating a method for spooling events to a file system according to some embodiments of the disclosure. As described previously, the method (600e) may be executed in response to a COB signal. Further, the method (600e) may be executed for each event stored in the distributed database.

In step 602e, the method (600e) selects a row key. In some embodiments, the row key comprises the event identifier field of a given event. In some embodiments, a salt digit may be added to the identifier to prevent hotspotting in the distributed database. In one embodiment, this hash comprises the first digit or character of a hash of the event identifier. The method (600e) receives at least one event in response to the row key. In some embodiments, the at least one event includes multiple versions of the same event as described above.

In step 604e, the method (600e) determines whether there are multiple versions of a given event. As described above, the secondary events in the table may include multiple versions of the same event caused late joins. Specifically, if a secondary event is received prior to the primary event (i.e., before a join), the event will be stored twice in a given cell, first for the un-joined version and second for the joined version.

In step 606e, the method (600e) selects the most recent secondary event as the proper secondary event and discards previous versions of the secondary event. Thus, in step 606e, the method (600e) discards any events preceding a successfully joined event. As a result, only one of the versions (the version after a join) is persisted, thus the duplicate previous version is discarded.

In step 608e, the method (600e) proceeds to determine if a primary event is available if only one version of the secondary exists as determined in step 604e. In one embodiment, the method (600e) performs step 608e by inspecting a primary available flag for the given event. In step 610e, if the primary event exists, the method (600e) will replay the secondary event.

In step 612e, the method (600e) then determines whether the secondary event was replayed. If so, the method (600e) save the replayed secondary event (step 614e). Otherwise, the method (600e) will determine that the secondary event is a "lonely" secondary event. That is, an event that is not joined or otherwise associated with a primary event. Rather than discard the event, since it is the only source of the data, the method (600e) flags the event as having failed to be joined to a corresponding primary event (step 616e). Downstream consumers may then use this data to perform remedial action as needed.

It should be noted that the output of the spooler comprises feeds for each event type. Thus, if click and serve events are received, the resulting fact feed will include a click event feed and a serve event feed. In the embodiment illustrated in FIG. 6E, the click event may be considered the secondary event. In some embodiments, a primary event feed is always written to the file system and thus the processing in FIG. 6E may not be implemented on a primary event table. However, in some events, secondary events may be deduplicated in the manner described to prevent unwanted duplicates.

Figure 7:
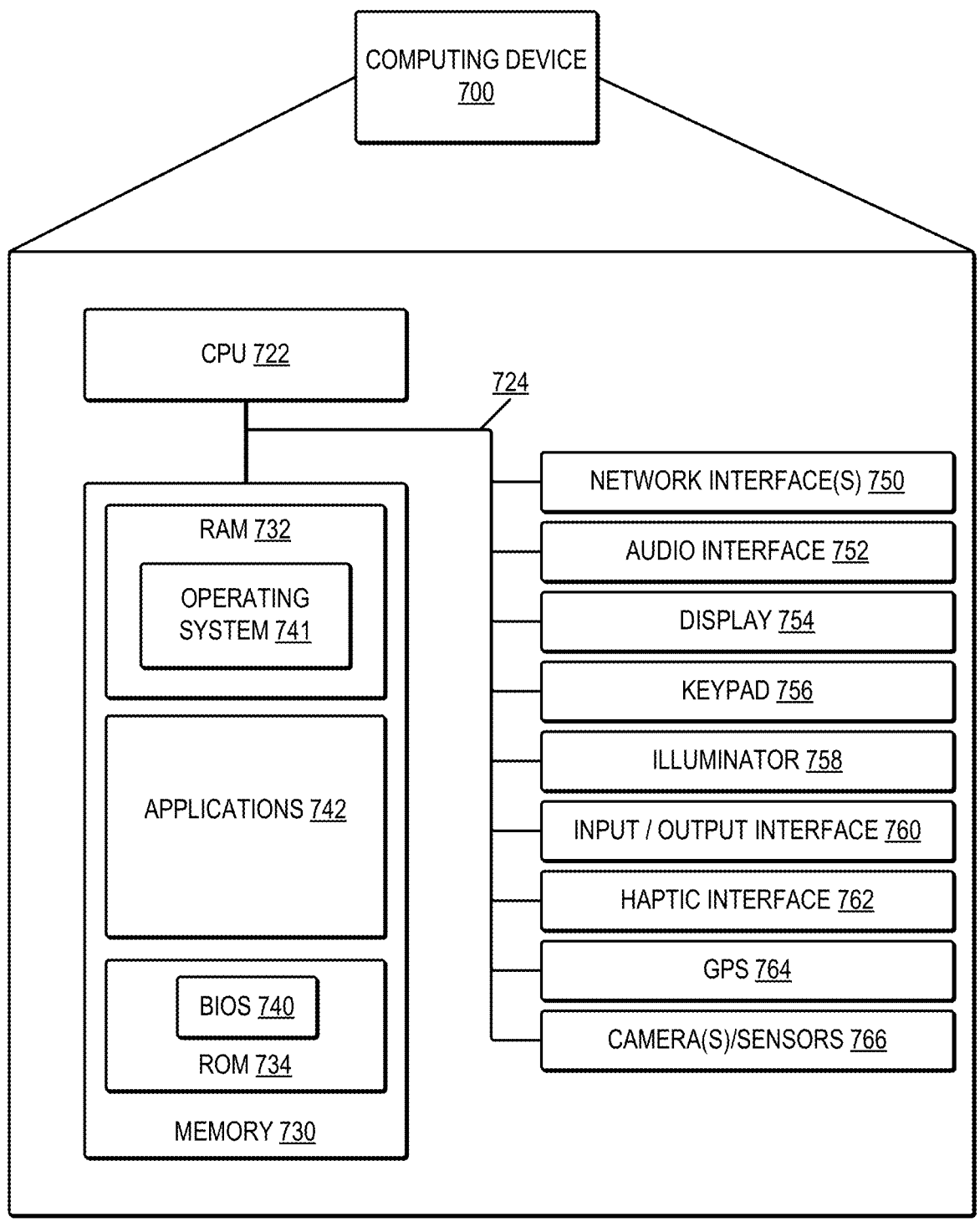
FIG. 7 is a schematic diagram illustrating a computing device showing an example embodiment of a client or server device used in the various embodiments of the disclosure.

FIG. 7 is a schematic diagram illustrating a computing device showing an example embodiment of a client or server device used in the various embodiments of the disclosure.

The computing device (700) may include more or fewer components than those shown in FIG. 7. For example, a server computing device may not include audio interfaces, displays, keypads, illuminators, haptic interfaces, GPS receivers, cameras, or sensors.

As shown in the figure, the device (700) includes a processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on the device (700) can change per device (700) model, per device (700) capabilities, and the like, or some combination thereof.

The computing device (700) may optionally communicate with a base station (not shown), or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises input/output interface (760) for communicating with external devices, using communication technologies, such as USB, infrared, Bluetooth™, or the like. The haptic interface (762) provides tactile feedback to a user of the client device.

Optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may through other components, provide other information that may be employed to determine a physical location of the device, including, for example, a MAC address, Internet Protocol (IP) address, or the like.

Mass memory (730) includes a RAM (732), a ROM (734), and other storage means. Mass memory (730) illustrates another example of computer storage media for storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from hard disk drive (not illustrated) and temporarily stored in RAM (732) by CPU (722). CPU (722) may then read the software or data from RAM (732), process them, and store them to RAM (732) again.

For this disclosure, a module is a software, hardware, or firmware (or combination thereof) system, process or functionality, or component thereof. A module performs or facilitates the processes, features, or functions described herein (with or without human interaction or augmentation).

A module can include sub-modules. Software components of a module may be stored on a computer-readable medium for execution by a processor. Modules may be integral to one or more servers or be loaded and executed by one or more servers.

The terms "user," "subscriber," "consumer" or "customer" refer to a user of an application or applications as described herein or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

One of skill in the art may implement the methods and systems of the present disclosure in many manners. As such, the disclosed embodiments are not to be limited by the preceding exemplary embodiments and examples. In other words, functional elements being performed by single or multiple components, in various combinations of hardware and software or firmware, and individual functions, may be distributed among software applications at either the client level or server level or both. In this regard, one may combine any number of the features of the different embodiments described herein into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces. The scope of the present disclosure may also cover variations and modifications made to the hardware or software or firmware components described herein as would be understood by those skilled in the art.

Furthermore, the embodiments of methods presented and described as flowcharts in this disclosure are provided by way of example to provide a complete understanding of the technology. The disclosed methods are not limited to the operations and logical flow presented herein. Alternative embodiments exist that alter the order of the various operations or include independent sub-operations that are part of a more extensive operation.

While the disclosure describes various embodiments, such embodiments should not limit the teaching of this disclosure to those embodiments. Various changes and modifications may be made to the elements and operations described above to obtain a result that remains within the scope of the systems and processes described in this disclosure.

What is claimed is:

1. A method comprising:
   receiving an event, the event having a header that includes at least one secondary event in a list of secondary identifiers included in the header;
   writing the event to a table in a database, the table selected based on a respective event type field and timestamp associated with the event;
   deduplicating the event and the at least one secondary event in response to a close of books (COB) signal;
   selecting one of the event or the at least one secondary event for writing, as a deduplicated event, to a storage device; and
   writing the deduplicated event to the storage device.

2. The method of claim 1, further comprising executing a table creation process to periodically create a set of new tables in the database.

3. The method of claim 1, further comprising executing a table pruning process to periodically discard unused tables in the database.

4. The method of claim 1, the receiving a stream of events comprising receiving a plurality of messages from a streaming queue.

5. The method of claim 4, further comprising extracting the events from the plurality of messages.

6. The method of claim 1, further comprising setting a flag for the at least one secondary event comprising setting the flag for the at least one secondary event stored in a second table.

7. The method of claim 6, further comprising deferring the writing the event until the setting the flag is completed.

8. The method of claim 1, further comprising detecting that the event is a duplicate event of a previously written event written to the table of the database.

9. The method of claim 8, further comprising writing the event to a cell associated with the previously written event and updating a version identifier of the event.

10. The method of claim 1, the deduplicating the event and the at least one secondary event comprising:
    determining that the at least one secondary event includes multiple versions; and
    selecting a most recent version of the at least one secondary event as the at least one deduplicated event.

11. The method of claim 10, the deduplicating the event and the at least one secondary event comprising replaying the at least one secondary event if the at least one secondary event includes a flag.

12. The method of claim 11, further comprising setting a join status of the most recent version of the event as failed if the at least one secondary event does not include the flag and was not replayed.

13. A non-transitory computer-readable storage medium for tangibly storing computer program instructions capable of being executed by a computer processor, the computer program instructions defining steps of:
    receiving an event, the event having a header that includes at least one secondary event in a list of secondary identifiers included in the header;
    writing the event to a table in a database, the table selected based on a respective event type field and timestamp associated with the event;
    deduplicating the event and the at least one secondary event in response to a close of books (COB) signal;
    selecting one of the event or the at least one secondary event for writing as a deduplicated event to a storage device; and
    writing the deduplicated event to the storage device.

14. The non-transitory computer-readable storage medium of claim 13, further comprising executing a table creation process to periodically create a set of new tables in the database.

15. The non-transitory computer-readable storage medium of claim 13, further comprising executing a table pruning process to periodically discard unused tables in the database.

16. The non-transitory computer-readable storage medium of claim 13, the receiving a stream of events comprising receiving a plurality of messages from a streaming queue.

17. The non-transitory computer-readable storage medium of claim 13, further comprising setting a flag for the at least one secondary event comprising setting the flag for the at least one secondary event stored in a second table.

18. The non-transitory computer-readable storage medium of claim 13, further comprising detecting that the event is a duplicate event of a previously written event written to the table of the database.

19. The non-transitory computer-readable storage medium of claim 13, the deduplicating the event and the at least one secondary event comprising:
- determining that the at least one secondary event includes multiple versions; and
- selecting a most recent version of the at least one secondary event as the at least one deduplicated event.

20. A device comprising:
- a processor; and
- a storage medium for tangibly storing thereon logic for execution by the processor, the logic comprising instructions for:
  - receiving an event, the event having a header that includes at least one secondary event in a list of secondary identifiers included in the header;
  - writing the event to a table in a database, the table selected based on a respective event type field and timestamp associated with the event;
  - deduplicating the event and the at least one secondary event in response to a close of books (COB) signal;
  - selecting one of the event or the at least one secondary event for writing as a deduplicated event to a storage device; and
- writing the deduplicated event to the storage device.

* * * * *